Figure 2:
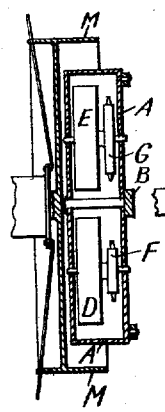

W T. LORD.
CHANGE SPEED GEARING FOR MOTOR VEHICLES.
APPLICATION FILED JUNE 13, 1912.

1,049,883.

Patented Jan. 7, 1913.

Inventor
W. T. Lord

Witnesses

UNITED STATES PATENT OFFICE.

WILLIAM TURNER LORD, OF KENSINGTON, LONDON, ENGLAND.

CHANGE-SPEED GEARING FOR MOTOR-VEHICLES.

1,049,883.  Specification of Letters Patent.  Patented Jan. 7, 1913.

Application filed June 13, 1912. Serial No. 703,499.

*To all whom it may concern:*

Be it known that I, WILLIAM TURNER LORD, a subject of the King of Great Britain and Ireland, residing at 3 Holland Lane, Kensington, London, W., England, have invented certain new and useful Improvements in Change-Speed Gearing for Motor-Vehicles, of which the following is a specification.

This invention relates to change speed gearing for motor vehicles and the like, and comprises two or more pairs of chain wheels combined with friction rollers mounted in frames consisting of rocking bar or frame carriers, the chain wheels being driven from the engine or other motive power directly or through a counter shaft and the friction rollers being arranged to drive on the inside edge of a rim or drum. One pair consists of two unequal sized or unequally geared elements mounted on rocking frames (those in the drawing work see-saw fashion) one of the pair giving speed or high gear and the other power or low gear, and they are arranged so that both may run clear of the driving rim for neutral or free engine; or, when moved by a lever or other controlling device either one or other of the unequally geared elements can be set into action against the rim while the other is withdrawn proportionately. Necessary friction surfaces may be obtained by the use of any material in the rollers or in the rim, or the rim can be lined pneumatically.

Figure 1:
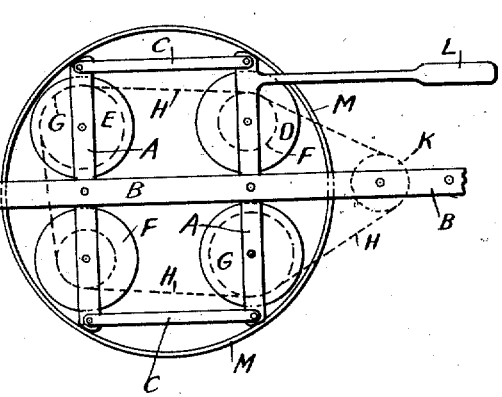
Figure 3:
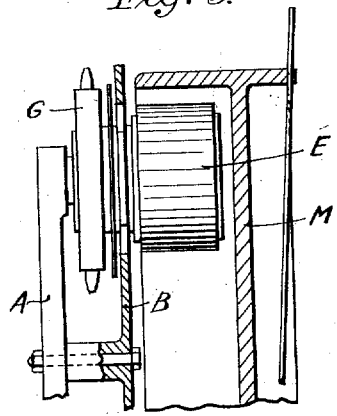

To better explain this invention I append a drawing where:

Figure 1 is an elevation, Fig. 2 a section, and Fig. 3 a similar view to Fig. 2 illustrating a slightly modified form of construction.

As shown, two pairs of rollers with associated chain wheels are mounted in frames A A which are pivoted on a carrier B which serves as a fulcrum and support. The frames A A are linked together by the links C C to compel corresponding movement of the two pairs, and a lever L is indicated as the controlling agency. M is a rim against which the friction rollers are intended to work. The opposite rollers D D with their chain wheels F F advance against or recede from M together, upon the movement of L, while at the same time the rollers E E with the larger chain wheels G G recede and advance against M, and as the motive power is conveyed through K by means of the continuous chain H H to the chain wheels F F and G G it is evident that more power (but with less speed) is given to E E with their larger chain wheels than to D D with their smaller ones. In some cases I use my pulleys externally.

In Fig. 3 an alternative method of mounting the friction rollers with their chain wheels is illustrated. One of the rollers E only is shown as an example with its sprocket wheel G. These are mounted on a stud shaft or journal fixed only in the lever or rocking frame member A mounted on the fixed carrier plate B.

The apparatus can be duplicated or compounded to gain other speeds (or increase of frictional power) one of which by any suitable mechanical means can be made to work reversely.

One application of the invention to motor vehicles will in the case of motor cycles, be as follows: The combination of the parts A A, B B and C C becomes a framework carrier (the details of which would require modification to suit special circumstances or machines) this carrier would be fixed or fitted to the framework or body of the motor cycle, while the rim M M would be fixed to the wheel to be driven.

What I claim and desire to secure by Letters Patent is:—

1. The combination with a member to be driven, of two pairs of friction rollers, chain wheels combined with said rollers, and a driving chain common to all of said rollers, said rollers being so arranged that when either pair is placed in contact with the member to be driven an equilibrium of pressure and power is produced.

2. The combination with a member to be driven, of two pairs of friction rollers, chain wheels combined with said rollers, a driving chain common to all of said rollers, said rollers being so arranged that when either pair is placed in contact with the member to be driven an equilibrium of pressure and power is produced, rocking bars on which said rollers are mounted, and parallel bars connecting said rocking bars.

3. The combination with a driving wheel, of a direct chain driving gear, two friction rollers having equal pressure, a chain wheel attached to each roller, and a driving chain for said wheels common to all the wheels.

4. The combination with a driving wheel, of a direct chain driving gear, pairs of friction rollers the rollers of each pair having equal pressure, a chain wheel attached to each roller, a driving chain for said wheels common to all the wheels, and a compound rocking parallel bar frame on which said rollers are mounted.

In testimony whereof I have affixed my signature, in presence of two witnesses.

WILLIAM TURNER LORD.

Witnesses:
 FRED HOWARD MICHAEL,
 FREDK. C. WAKLEY.

Copies of this patent may be obtained for five cents each, by addressing the "Commissioner of Patents. Washington, D. C."